US011057605B2

(12) United States Patent
Wee et al.

(10) Patent No.: US 11,057,605 B2
(45) Date of Patent: Jul. 6, 2021

(54) 360-DEGREE VR VIDEO SEGMENTATION TRANSMISSION SYSTEM AND METHOD

(71) Applicant: KOREA ELECTRONICS TECHNOLOGY INSTITUTE, Seongnam-si (KR)

(72) Inventors: Jungwook Wee, Seoul (KR); Woochool Park, Incheon (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 16/713,417

(22) Filed: Dec. 13, 2019

(65) Prior Publication Data

US 2020/0145638 A1 May 7, 2020

Related U.S. Application Data

(63) Continuation of application No. PCT/KR2018/014571, filed on Nov. 23, 2018.

(30) Foreign Application Priority Data

Nov. 5, 2018 (KR) .................. 10-2018-0134705

(51) Int. Cl.
*H04N 13/194* (2018.01)
*H04N 13/178* (2018.01)
(Continued)

(52) U.S. Cl.
CPC ......... *H04N 13/194* (2018.05); *H04N 13/161* (2018.05); *H04N 13/178* (2018.05); *H04N 2013/0092* (2013.01)

(58) Field of Classification Search
CPC .. H04N 13/194; H04N 13/178; H04N 13/161; H04N 2013/0092
See application file for complete search history.

(56) References Cited

U.S. PATENT DOCUMENTS

2005/0141559 A1* 6/2005 Choi .................. H04N 21/4305
  370/469
2006/0209709 A1* 9/2006 Kovacevic ....... H04N 21/23424
  370/252
(Continued)

FOREIGN PATENT DOCUMENTS

JP    2015-029308 A      2/2015
JP    2015029308 A  *    2/2015
(Continued)

OTHER PUBLICATIONS

Ying Luo, View-dependent Omnidirectional Video Encapsulation using Multiple Tracks, 2017, International Conference on Virtual Reality and Visualization (Year: 2017).*

(Continued)

*Primary Examiner* — Rowina J Cattungal
(74) *Attorney, Agent, or Firm* — Knobbe Martens Olson & Bear LLP (57) ABSTRACT

A 360-degree virtual reality (VR) video segmentation transmission system and a method are disclosed. The system includes a transmitter and a receiver. The transmitter designs a frame for transmitting a 360-degree VR video divided into multiple channels, based on a motion picture expert group (MPEG) transport stream (TS), and transmits a signal combining the designed frame and a header for each of the multiple channels. The receiver receives the signal from the transmitter for each channel, combines contents contained in the received signal through synchronization, and outputs the combined contents.

18 Claims, 7 Drawing Sheets

(51) Int. Cl.
    *H04N 13/161*    (2018.01)
    *H04N 13/00*     (2018.01)

(56) References Cited

U.S. PATENT DOCUMENTS

| | | | |
|---|---|---|---|
| 2011/0154425 A1* | 6/2011 | Kim | H04N 21/631 |
| | | | 725/116 |
| 2016/0227005 A1* | 8/2016 | Kwon | H04H 60/73 |
| 2017/0223368 A1* | 8/2017 | Abbas | H04N 19/59 |
| 2018/0213202 A1* | 7/2018 | Kopeinigg | H04N 13/161 |
| 2018/0220120 A1* | 8/2018 | Watson | H04N 21/23439 |
| 2018/0270486 A1* | 9/2018 | Liu | H04L 65/608 |
| 2019/0356894 A1* | 11/2019 | Oh | G06F 3/011 |
| 2020/0058165 A1* | 2/2020 | Choi | G06T 5/50 |
| 2020/0084516 A1* | 3/2020 | Yun | H04H 20/72 |
| 2020/0204785 A1* | 6/2020 | Lee | H04N 21/23614 |
| 2020/0260071 A1* | 8/2020 | Hannuksela | H04N 19/105 |
| 2020/0388002 A1* | 12/2020 | Jung | H04N 13/178 |

FOREIGN PATENT DOCUMENTS

| | | | |
|---|---|---|---|
| KR | 10-2005-0066950 A | 6/2005 |
| KR | 10-2008-0057447 A | 6/2008 |
| KR | 10-2011-0069670 A | 6/2011 |
| KR | 10-1347956 B1 | 1/2014 |
| KR | 10-2017-0003904 A | 1/2017 |

OTHER PUBLICATIONS

International Search Report of corresponding PCT Application No. PCT/KR2018/014571—3 pages (dated Aug. 7, 2019).

* cited by examiner

| 0 | | 15 | | 31 |
|---|---|---|---|---|
| TS_Header ||||| 
| Packet_ID ||||| 
| No_of_Packet || Sync_index_ms |||
| Sync_index_ls || Content_length[0] |||
| Content_length[1] || Content_length[2] |||
| Content_length[3] || reserved |||

```
int m_nFreq[8];        // Center frequencies - 8 channels std::thread* m_pThreadRun = nullptr;     // Main Thread
std::thread* m_pThreadMerge = nullptr;   // Contents merging thread (Rx)

std::string m_strTxFile[4];     // File name of transmission bool m_bRun = false;
bool m_bFile = false;

int m_nFiles = 1;
int m_nChannels = 1;
int m_nBitrate[4];

DtDevice m_dtDev;              // Tx/Rx Device
DtOutpChannel m_dtOut[8];      // For transmitter
DtInpChannel m_dtIn[12];       // For receiver // Stream Queue
std::mutex m_mtxStream[12];
std::queue <TSBuffer> m_qStreams[12];

void* m_pHwnd = nullptr;
CBEVENT m_fpEvent = 0;
```

FIG. 7

```
// Transmitter thread function
static int startTransmitProc(void* pHwnd);
int OnTransmit(void);

// Receiver thread function
static int startReceiveProc(void* pHwnd);
int OnReceive(void);

// Contents sync thread function
static int mergeStreamProc(void* pHwnd);
int OnMergeStream(void);

// Setup Transmitter
int setTransmitter(int* nFreq);

// Setup Receiver
int setReceiver(int* nFreq);

// Callback function
int SetCallback(void* pHwnd, void* fpCallback);

// Start transmitter
int StartTx(std::string strFilename, int nChannel = 1);
int StartTx(int nFiles, char* strFilename[4], int nChannel = 1);

// Start receiver
int StartRx(std::string strFilename, int nChannel = 1);
int StartRx(void* pHwnd, void* fpCallback, int nChannel = 1);

// Stop transmitter or receiver
void Stop(void);
```

FIG. 8

```
// Set Callback function
//      pHwnd: Parent handle
//      fpCallback: Callback function pointer
int SetQamCallback(void* pHwnd, void* fpCallback);

// Start Tx
//      nFiles: Number of Transmission files
//      strFilename: File names
//      nChannels: Number of Transmission channels
int StartTxQam(int nFiles, char* strFilename[4], int nChannels);
int StartRxQam(char* strFilename, int nChannels);

// Start Rx
//      pHwnd: Parent handle
//      fpCallback: Callback function pointer
//      nChannels: Number of receiving channels
int StartRxQam(void* pHwnd, void* fpCallback, int nChannels);

// Stop Rx
void StopQam(void);
```

360-DEGREE VR VIDEO SEGMENTATION TRANSMISSION SYSTEM AND METHOD

CROSS REFERENCE TO RELATED APPLICATIONS

This is a continuation application of International Patent Application No. PCT/KR2018/014571, filed on Nov. 23, 2018, which claims priority to Korean patent application No. 10-2018-0134705 filed on Nov. 5, 2018, contents of both of which are incorporated herein by reference in their entireties.

BACKGROUND

Technical Field

The present disclosure relates to a video transmission technology and, more particularly, to a 360-degree virtual reality (VR) video segmentation transmission system and method for transmitting a large-sized 360-degree VR video in real time.

Description of Related Technology

With the recent growth of communication technology, it is common to transmit and receive data between user devices at remote locations. For example, contents such as 360-degree VR videos or user created contents (UCC) are produced at one user device and transmitted in real time to any other user device located at a long distance.

Such video content has very large data size. So, if a data transfer rate is not high, a user of a receiving device may feel considerable inconvenience of using the video content. In particular, when any video content produced at a transmitting device in real time is transmitted to a receiving device, a high data transfer rate is essential for a user of the receiving device to comfortably enjoy the video content.

SUMMARY

Achieving a high data transfer rate in a broadcast network having a limited bandwidth generally requires much research on a technique for increasing the transfer rate by combining a plurality of channels.

An aspect of the present disclosure is to provide a 360-degree VR video segmentation transmission system and method for transmitting a large-sized 360-degree VR video through a broadcast network at a transfer rate of 200 Mbps or more.

Embodiments of the present invention provide a 360-degree VR video segmentation transmission system that includes a transmitter and a receiver. The transmitter designs a frame for transmitting a 360-degree VR video divided into multiple channels, based on a motion picture expert group (MPEG) transport stream (TS), and transmits a signal combining the designed frame and a header for each channel. The receiver receives the signal from the transmitter for each channel, combines contents contained in the received signals through synchronization, and outputs the combined contents.

In addition, the transmitter designs the frame such that a content bitrate of the frame is matched to a transmission bitrate.

In addition, the transmitter has a transfer rate of 200 Mbps or more by using a maximum of eight channels.

In addition, the receiver detects a start portion of the content by using a header of the signal received for each channel, and combines signals of respective channels by using a drop and skip, based on the detected start portion.

In addition, the frame includes metadata containing content information of the 360-degree VR video; super-frame connected with the metadata, divided into low resolution content and high resolution content according to bitrate, and having a predetermined transmission length; and null packet connected with the super-frame and inserted for bitrate matching.

In addition, the header includes MPEG-TS header having a size of 4 bytes; Packet_ID having a size of 4 bytes and containing information for identifying multi-channel transmission; No_of_Packet having a size of 2 bytes and containing information indicating a number of packets per channel; Sync_index having a size of 4 bytes and containing information associated with synchronized combination of the content; and Content_length having a size of 2 bytes and containing information indicating a length of content for each channel.

Embodiments of the present invention provide a 360-degree VR video segmentation transmission method using a 360-degree VR video segmentation transmission system including a transmitter and a receiver. The method includes, at the transmitter, designing a frame for transmitting a 360-degree VR video divided into multiple channels, based on an MPEG transport stream (TS), and transmitting a signal combining the designed frame and a header for each channel, and at the receiver, receiving the signal from the transmitter for each channel, combining contents contained in the received signals through synchronization, and outputting the combined contents.

In addition, the frame is designed such that a content bitrate of the frame matches a transmission bitrate.

In addition, the transmitter has a transfer rate of 200 Mbps or more by using a maximum of eight channels.

In addition, the receiver detects a start portion of the content by using a header of the signal received for each channel, and combines signals of respective channels by using a drop and skip, based on the detected start portion.

The 360-degree VR video segmentation transmission system and method according to some embodiments of the present invention can realize a real-time video streaming by designing a frame structure for transmitting a large-sized 360-degree VR video divided into multiple channels and by transmitting the large-sized 360-degree VR video at a transfer rate of 200 Mbps or more through the designed frame structure.

DETAILED DESCRIPTION

Hereinafter, embodiments of the present invention will be described in detail with reference to the accompanying drawings. In the drawings and descriptions, the same or corresponding elements are denoted by the same reference numerals. Also, in describing features of the present invention, techniques that are well known in the art will not be described. This is to avoid obscuring a subject matter of embodiments of the present invention by omitting an unnecessary explanation.

Figure 1:
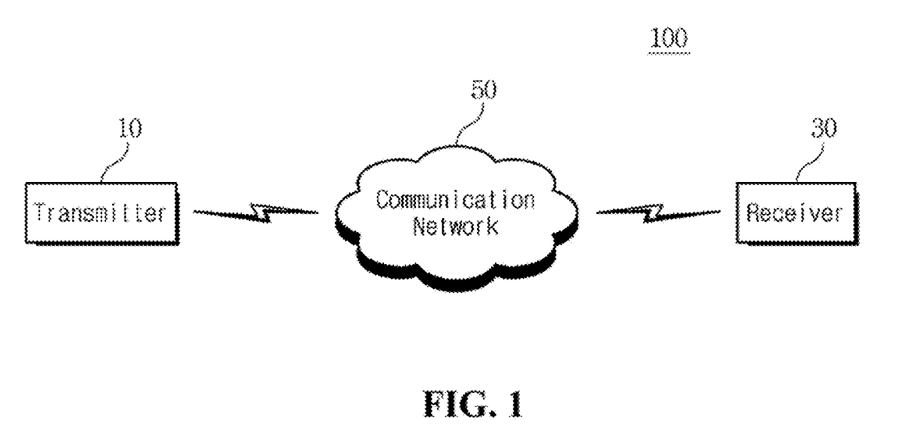
FIG. 1 is a schematic diagram illustrating a 360-degree VR video segmentation transmission system according to an embodiment of the present invention.
Figure 2:
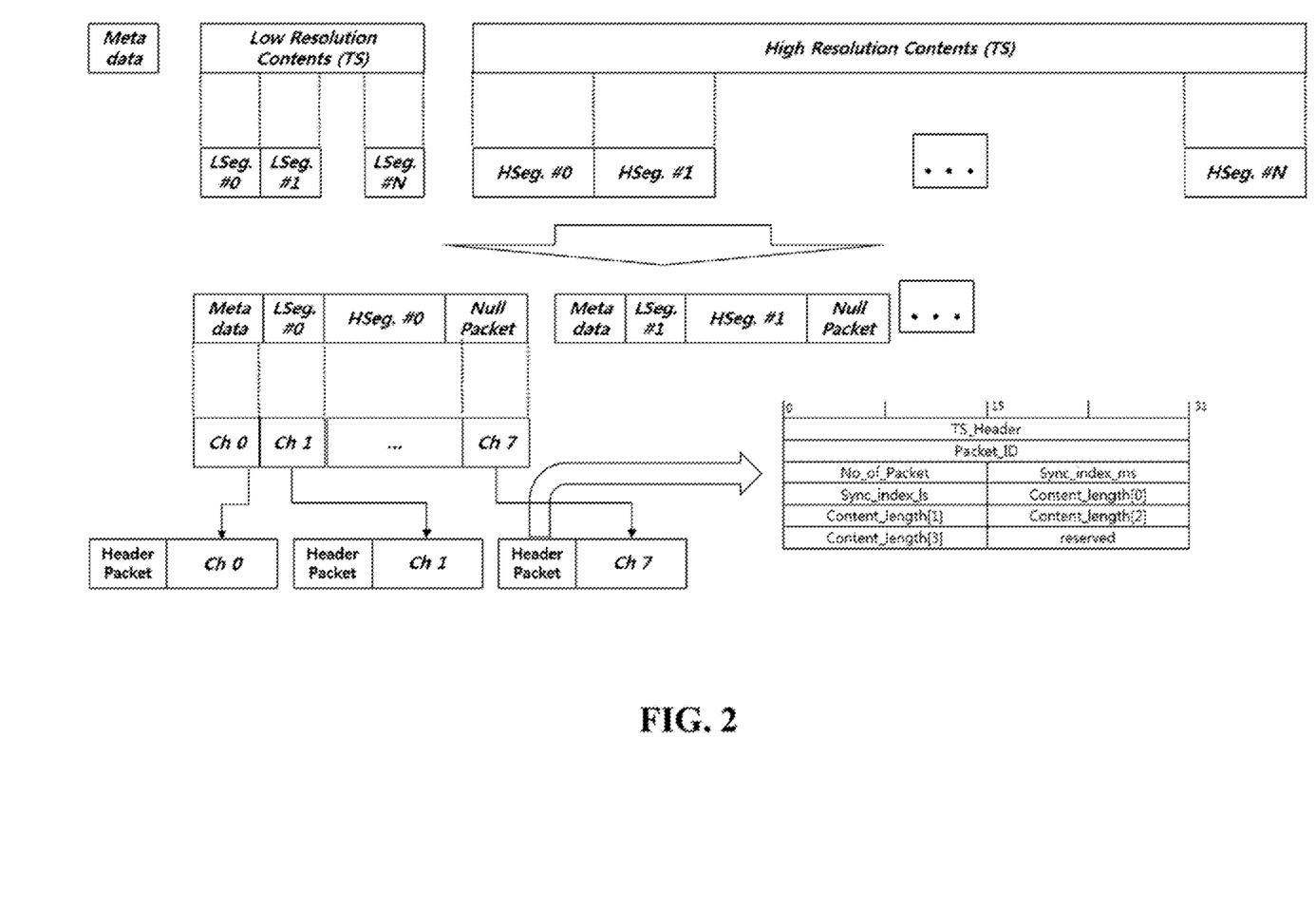
FIG. 2 is a diagram illustrating a frame structure according to an embodiment of the present invention.
Figure 3:
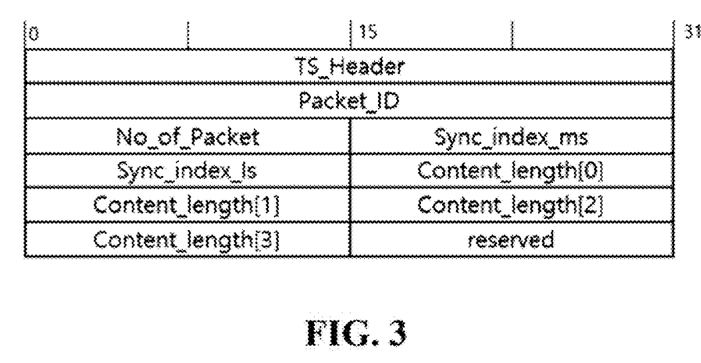
FIG. 3 is a diagram illustrating a packet header structure according to an embodiment of the present invention.

FIG. 1 is a schematic diagram illustrating a 360-degree VR video segmentation transmission system according to an embodiment of the present invention. FIG. 2 is a diagram illustrating a frame structure according to an embodiment of the present invention. FIG. 3 is a diagram illustrating a packet header structure according to an embodiment of the present invention.

Referring to FIGS. 1 to 3, the 360-degree VR video segmentation transmission system 100 enables a large-sized 360-degree VR video to be transmitted at a transfer rate of 200 Mbps or more. Through this, the 360-degree VR video segmentation transmission system 100 may realize a real-time streaming of a large-sized 360-degree VR video. The 360-degree VR video segmentation transmission system 100 includes a transmitter 10 and a receiver 30. The 360-degree VR video segmentation transmission system 100 further includes a communication network 50 that connects the transmitter 10 and the receiver 30. The communication network 50 may be, but not limited to, a typical cable broadcast network, and various types of communication networks may be applied.

The transmitter 10 is a device for segmenting and transmitting a 360-degree VR video to the receiver 30. The transmitter 10 corresponds to a streaming server and may include a smart phone, a desktop, a laptop, a tablet PC, a handheld PC, a server computer, a cluster computer, and the like.

The transmitter 10 designs a frame for transmitting the 360-degree VR video divided into multiple channels, based on an MPEG transport stream (TS). The transmitter 10 may design the frame such that a content bitrate of the frame is matched to a transmission bitrate. Through this, the transmitter 10 may increase transmission performance. Here, the bitrate means how many bits are contained in a video corresponding to one second. The higher the bitrate is, the more information is contained in a video and the better an image quality is.

The frame includes a plurality of contents, and the plurality of contents are metadata, super-frame, and null packet.

The metadata is located at the very beginning of the frame and includes content information of the 360-degree VR video. The metadata is information indicating an attribute of content information.

The super-frame includes low resolution content and high resolution content. Based on bitrate, the super-frame is divided into low resolution content and high resolution content. After divided, the super-frame has a predetermined transmission length. Each of the low resolution content and the high resolution content is divided into #0th to #Nth (N is a natural number), and the low and high resolution contents having the same number may be connected to form one super-frame. Here, the transmission length may be set according to the quality of content.

The null packet is connected with the super-frame and inserted for bitrate matching at the receiver 30. The null packet is inserted to match the content bitrate of the 360-degree VR video and the transmission bitrate. The null packet may be inserted into each super-frame.

The transmitter 10 divides the designed frame into multiple channels. For example, the transmitter 10 may divide each of #0th frame to #Nth frame into three channels (Ch0, Ch1, Ch2) each having the same size. The #0th frame may be composed of metadata, #0th low resolution content, #0th high resolution content, and null packet, and the sum of the #0th low resolution content and the #0th high resolution content may be referred to as #0th super frame. The #1st frame may be composed of metadata, #1 st low resolution content, #1st high resolution content, and null packet. The #Nth flame may be composed of metadata, #Nth low resolution content, #Nth high resolution content, and null packet.

The transmitter 10 transmits a signal combining each frame and a header to the receiver 30 for each channel. The transmitter 10 may combine the header with each frame separated for each channel. At this time, the header is connected to a header portion of the frame.

The header contains MPEG-TS header, Packet_ID, No_of_Packet, Sync_index, and Content_length.

The MPEG-TS header has a size of 4 bytes. The MPEG-TS header may be allocated to the 0th bit to the 31st bit of the header.

The Packet_ID has a size of 4 bytes. The Packet_ID may be allocated to the 0th bit to the 31 st bit of the header and contains information for identifying multi-channel transmission.

The No_of_Packet has a size of 2 bytes. The No_of_Packet may be allocated to the 0th bit to the 15th bit of the header. The No_of_Packet contains information indicating the number of packets per channel.

The Sync_index has a size of 4 bytes. The Sync_index may be classified into Sync_index_ms and Sync_index_ls. The Sync_index_ms may be allocated to the 16th bit to the 31st bit, and the Sync_index_ls may be allocated to the 0th bit to the 15th bit. The Sync_index contains information associated with synchronized combination of content performed at the receiver 30.

The Content_length has a size of 2 bytes. The Content_length contains information indicating the length of content for each channel. For example, content corresponding to channel 0 may be allocated to the 16th bit to the 31st bit of header, content corresponding to channel 1 may be allocated to the 0th bit to the 15th bit of header, and content corresponding to channel 2 may be allocated to the 16th bit to the 31st bit of header.

The receiver 30 is a device for receiving the 360-degree VR video transmitted through segmentation, combining the segmented 360-degree VR video, and outputting the combined 360-degree VR video. The receiver 30 corresponds to an electronic device or a terminal and may include a smart phone, a desktop, a laptop, a tablet PC, a handheld PC, or the like.

The receiver 30 receives a signal from the transmitter 10 for each channel. Contrary to the transmitter 10, the receiver 30 includes a structure for synchronization. That is, the receiver 30 combines contents contained in the received signals through synchronization. The signals from which contents are separated are delivered to the application.

Figure 4:
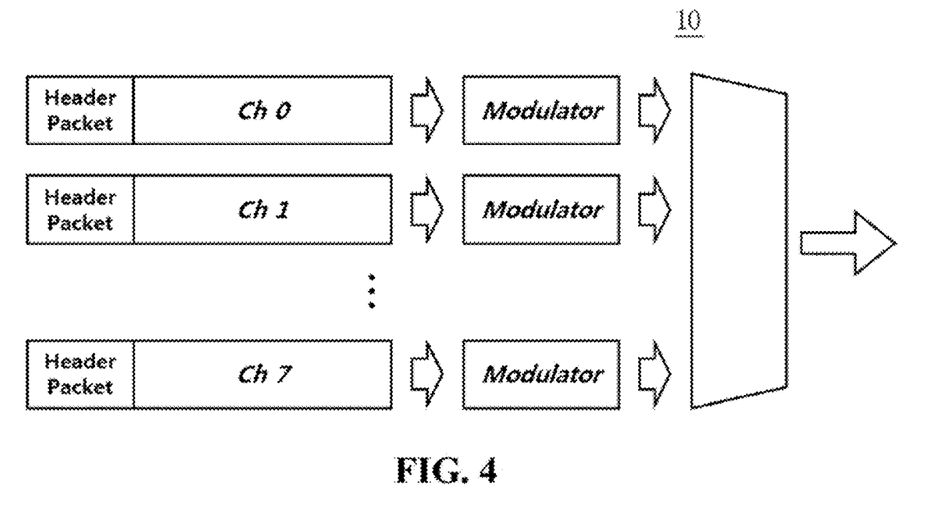
FIG. 4 is a diagram illustrating a transmitter according to an embodiment of the present invention.
Figure 5:
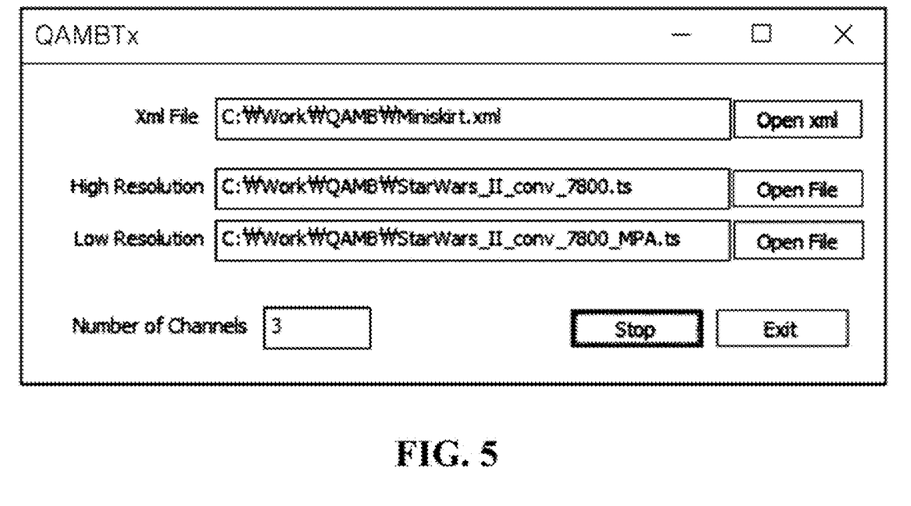
FIG. 5 is a diagram illustrating a software execution result of a transmitter according to an embodiment of the present invention.
Figure 6:
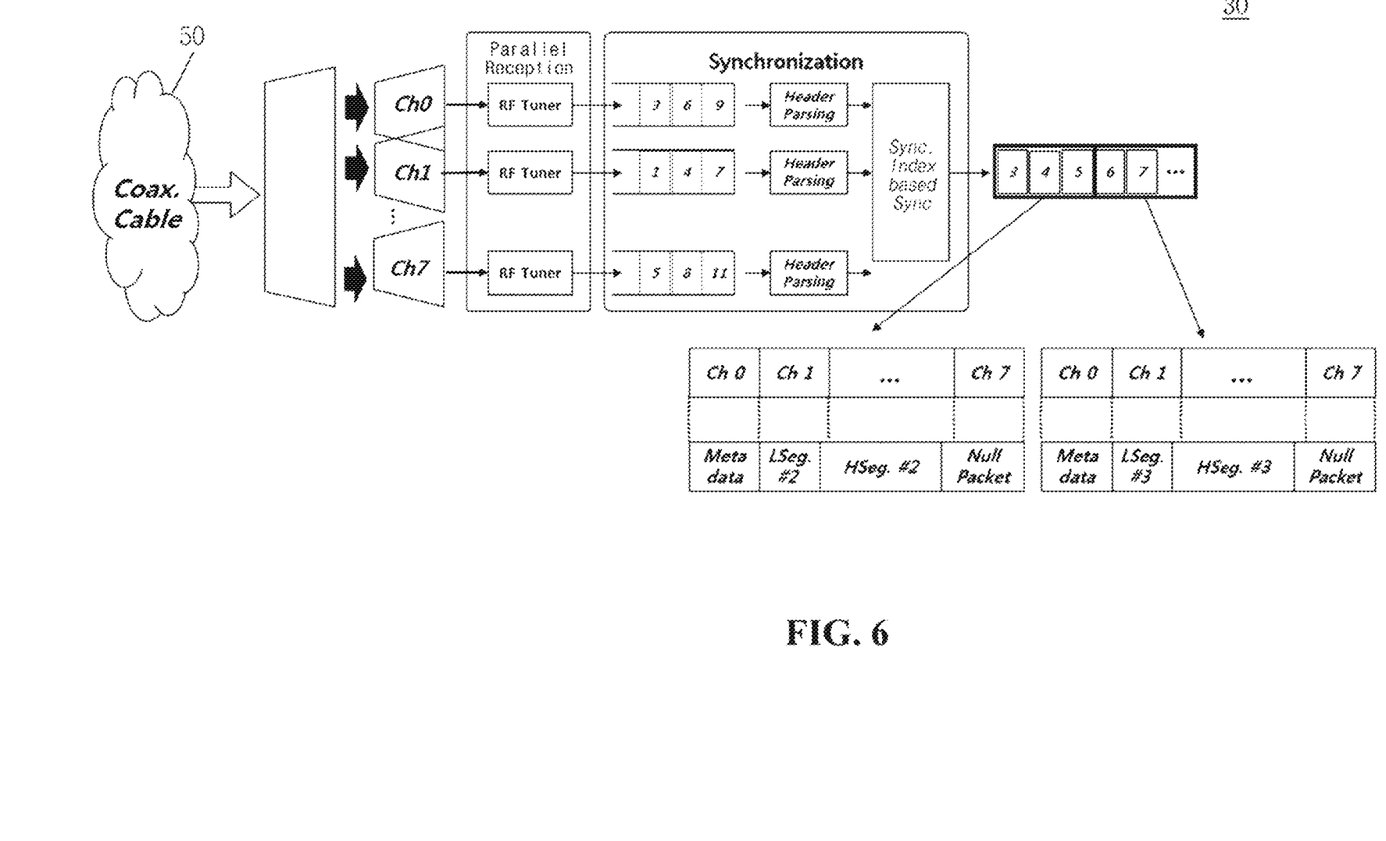
FIG. 6 is a diagram illustrating a receiver according to an embodiment of the present invention.
Figure 7:
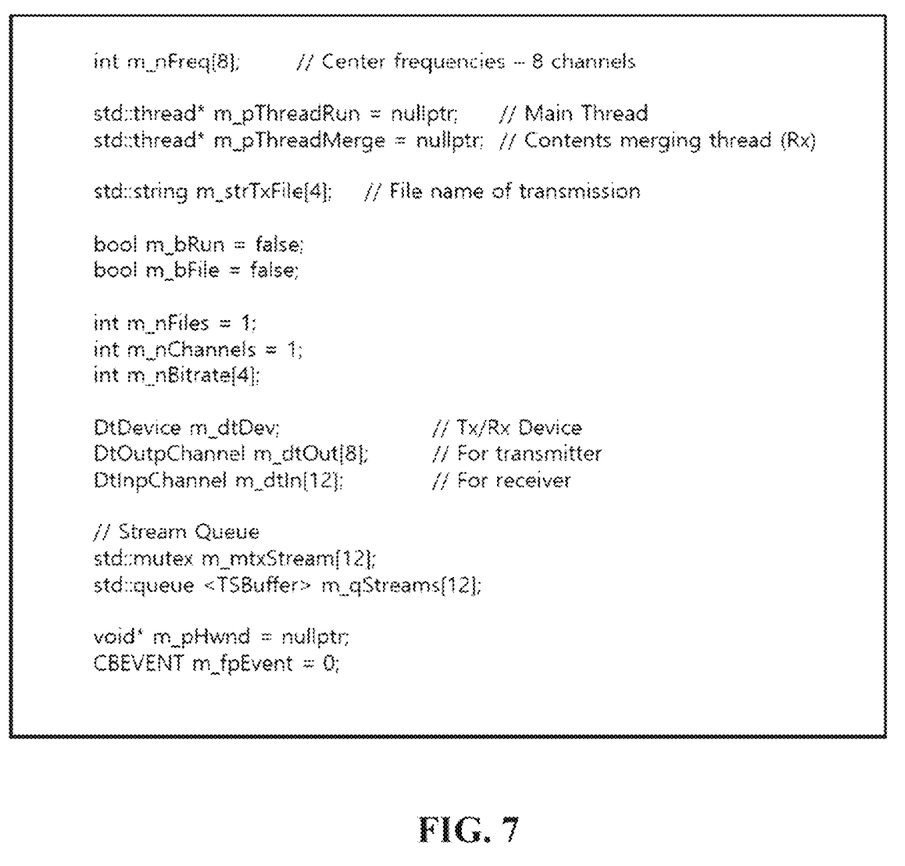
FIG. 7 is a diagram illustrating a member variable of a 360-degree VR video segmentation transmission system according to an embodiment of the present invention.
Figure 8:
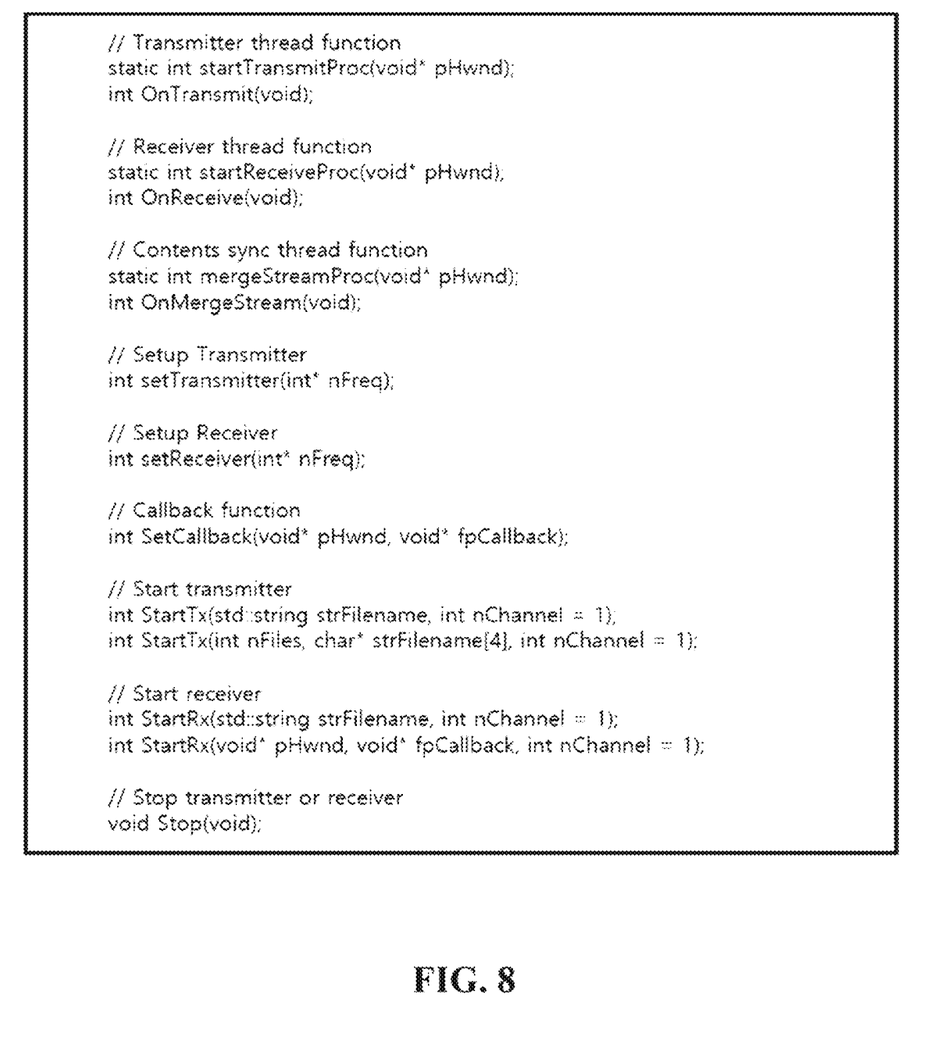
FIG. 8 is a diagram illustrating a member function of a 360-degree VR video segmentation transmission system according to an embodiment of the present invention.
Figure 9:
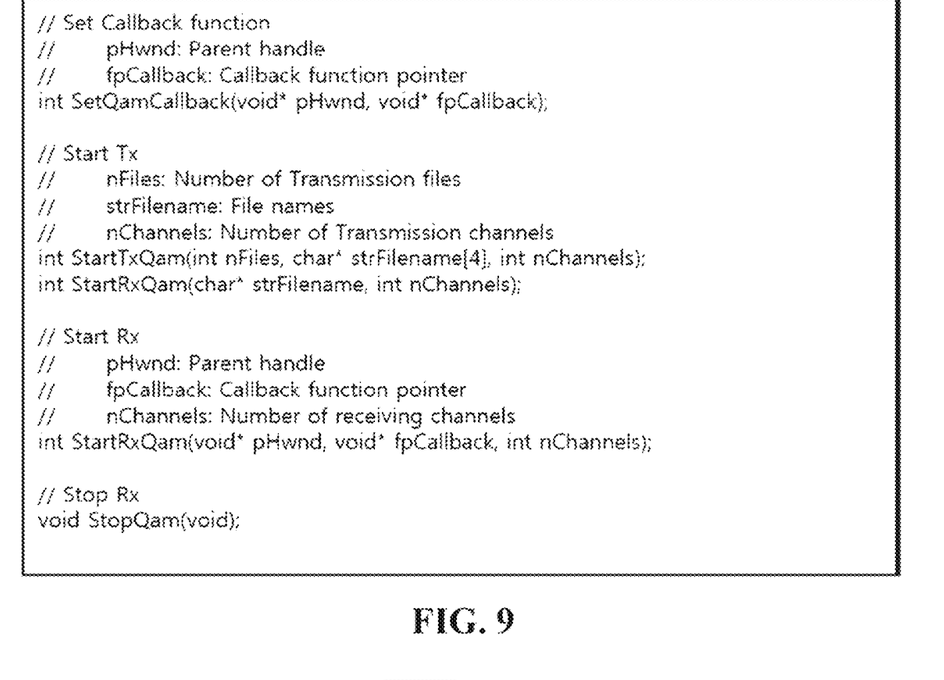
FIG. 9 is a diagram illustrating an API function of a 360-degree VR video segmentation transmission system according to an embodiment of the present invention.

FIG. 4 is a diagram illustrating a transmitter according to an embodiment of the present invention. FIG. 5 is a diagram illustrating a software execution result of a transmitter according to an embodiment of the present invention. FIG. 6 is a diagram illustrating a receiver according to an embodiment of the present invention. FIG. 7 is a diagram illustrating a member variable of a 360-degree VR video segmentation transmission system according to an embodiment of the present invention. FIG. 8 is a diagram illustrating a member function of a 360-degree VR video segmentation transmission system according to an embodiment of the present invention. FIG. 9 is a diagram illustrating an API function of a 360-degree VR video segmentation transmission system according to an embodiment of the present invention.

Referring to FIGS. 1 to 9, the 360-degree VR video segmentation transmission system 100 may implement the transmitter 10 and the receiver 30 in software. That is, the transmitter 10 and the receiver 30 may be represented by source codes as shown in FIGS. 7 to 9. The software implemented in FIGS. 7 to 9 is, but not limited to, a C++ Class (CQamTxRx), and any other software may be used for implementing the transmitter 10 and the receiver 30.

The transmitter 10 transmits a 360-degree VR video in a maximum of eight channels. To this end, the transmitter 10 has modulators for respective channels to modulate signals. The transmitter 10 muxes (or multiplexes) the signals outputted from the respective modulators through a multiplexer and then transmits the muxed signal to the receiver 30 through the communication network 50. Using eight channels, the transmitter 10 can realize a transfer rate of 200 Mbps or more.

The receiver 30 combines and outputs signals transmitted in eight channels. To this end, the receiver 30 receives signals in parallel for the respective channels by demuxing (or demultiplexing) the received signal through a demultiplexer. The receiver 30 synchronizes and combines contents contained in the parallel-received signals. At this time, the receiver 30 detects a start portion of the content by using the header of the signal received for each channel, and stores the detected start portion in each channel buffer. In addition, the receiver 30 combines signals of respective channels by using a drop and skip, based on the detected start portion. That is, the receiver 30 may combine the received signals of the respective channels through the drop and skip by using sync_index of the header and output them. The receiver 30 separates contents from the output signal and delivers it to the application. The separated contents may be metadata, low resolution content, and high resolution content.

Figure 10:
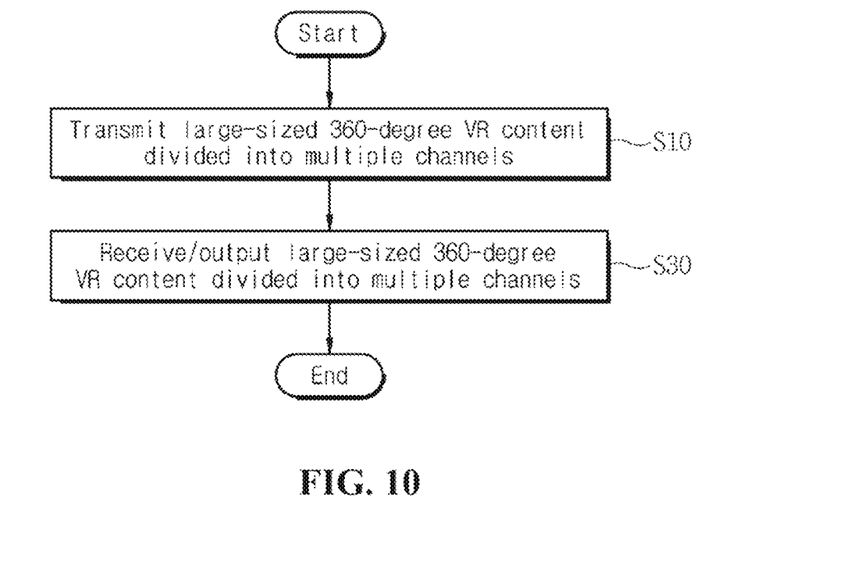
FIG. 10 is a flow diagram illustrating a 360-degree VR video segmentation transmission method according to an embodiment of the present invention.

FIG. 10 is a flow diagram illustrating a 360-degree VR video segmentation transmission method according to an embodiment of the present invention.

Referring to FIGS. 1 and 10, the 360-degree VR video segmentation transmission method designs a frame structure for transmitting a large-sized 360-degree VR video divided into multiple channels, and transmits the large-sized 360-degree VR video at a transfer rate of 200 Mbps or more by using the designed frame structure. Through this, the 360-degree VR video segmentation transmission method can perform real-time VR streaming.

At step S10, the transmitter 10 designs a frame for transmitting a 360-degree VR video divided into multiple channels based on an MPEG transport stream, and transmits a signal combining the designed frame and a header to the receiver 30 for each channel. The transmitter 10 may design the frame such that a content bitrate of the frame is matched to a transmission bitrate. Transmitting the 360-degree VR video divided into multiple channels, the transmitter 10 may have a transfer rate of 200 Mbps or more.

At step S30, the receiver 30 receives signals of respective channels from the transmitter 10, combines contents contained in the received signals through synchronization, and outputs them. At this time, the receiver 30 may detect a start portion of the content by using a header of the signal received for each channel, and combine the signals of respective channels by using a drop and skip based on the detected start portion. In addition, the receiver 30 separates each content from the output signal and delivers it to the application.

Meanwhile, in the above description and the drawings, an example of dividing a frame into eight channels to be transmitted is disclosed. Embodiments of the present invention is not limited thereto. Depending on environments and situation, various numbers of channels may be applied.

While the present invention has been particularly shown and described with reference to some embodiments thereof, it will be understood by those skilled in the art that various changes in form and details may be made therein without departing from the scope of the present invention as defined by the appended claims.

What is claimed is:

1. A 360-degree virtual reality (VR) video segmentation transmission system comprising:
   a transmitter configured to:
      generate a plurality of frames of a 360-degree VR video comprising a low resolution content and a high resolution content for transmitting the 360-degree VR video through multiple channels based on a motion picture expert group (MPEG) transport stream (TS), the low resolution content comprising a plurality of low resolution content segments, the high resolution content comprising a plurality of high resolution content segments, each of the plurality of frames comprising metadata, one of the plurality of low resolution content segments, one of the plurality of high resolution content segments and a null packet;
      generate a plurality of header packets, process each frame to generate a plurality of frame segments of each frame, and generate a plurality of channel signals, each of which contains one of the plurality of header packets and one of the plurality of frame segments; and
      transmit each of the plurality of channel signals of each frame through a corresponding one of the multiple channels; and
   a receiver configured to receive the plurality of channel signals from the transmitter transmitted through the multiple channels to combine contents contained in the received channel signals through synchronization, and to output the combined contents.

2. The system of claim 1, wherein the transmitter is configured to design each frame such that a content bitrate of the frame matches a transmission bitrate.

3. The system of claim 2,
   wherein the metadata in each frame contains content information of the 360-degree VR video;

wherein one of the low resolution segments and one of the high resolution segments in each frame form a super-frame connected with the metadata; and wherein the null packet in each frame is connected with the super-frame and inserted for bitrate matching.

4. The system of claim 1, wherein the transmitter has a transfer rate of 200 Mbps or more by using a maximum of eight channels.

5. The system of claim 1, wherein the receiver is configured to detect a start portion based on the header packet of each channel signal transmitted through each channel, and to combine the received channel signals by using a drop and skip based on the detected start portion.

6. The system of claim 1, wherein the header packet of each channel signal includes:
    an MPEG-TS header having a size of 4 bytes;
    a packet_ID having a size of 4 bytes and containing information for identifying multi-channel transmission;
    a no_of_packet having a size of 2 bytes and containing information indicating a number of packets per channel;
    a sync_index having a size of 4 bytes and containing information associated with synchronized combination of the content; and
    a content_length having a size of 2 bytes and containing information indicating a length of content for each channel.

7. The system of claim 1, wherein the metadata and the low resolution content segment of each frame are contained in different channel signals among the plurality of channel signals.

8. The system of claim 1, wherein the metadata and the high resolution content segment of each frame are contained in different channel signals among the plurality of channel signals.

9. The system of claim 1, wherein the metadata and the null packet of each frame are contained in different channel signals among the plurality of channel signals.

10. The system of claim 1, wherein the low resolution content segment and the null packet of each frame are contained in different channel signals among the plurality of channel signals.

11. A 360-degree virtual reality (VR) video segmentation transmission method using a 360-degree VR video segmentation transmission system including a transmitter and a receiver, the method comprising:
    generating, at the transmitter, a plurality of frames of a 360-degree VR video comprising a low resolution content and a high resolution content for transmitting the 360-degree VR video through multiple channels based on a motion picture expert group (MPEG) transport stream (TS), the low resolution content comprising a plurality of low resolution content segments, the high resolution content comprising a plurality of high resolution content segments, each of the plurality of frames comprising metadata, one of the plurality of low resolution content segments, and one of the plurality of high resolution content segments and a null packet;
    generating a plurality of header packets, processing each frame to generate a plurality of frame segments of each frame, and further generating a plurality of channel signals, each of which contains one of the plurality of header packets and one of the plurality of frame segments; and
    transmitting each of the plurality of channel signals of each frame to the receiver through a corresponding one of the multiple channels so that the receiver receives and processes the plurality of channel signals to output the 360-degree VR video.

12. The method of claim 11, wherein a content bitrate of each frame matches a transmission bitrate.

13. The method of claim 11, wherein the transmitter has a transfer rate of 200 Mbps or more by using a maximum of eight channels.

14. The method of claim 11, wherein the receiver detects a start portion based on the header packet of the each channel signal transmitted through each channel, and combines the received channel signals by using a drop and skip based on the detected start portion.

15. The method of claim 11, wherein the metadata and the low resolution content segment of each frame are contained in different channel signals among the plurality of channel signals.

16. The method of claim 11, wherein the metadata and the high resolution content segment of each frame are contained in different channel signals among the plurality of channel signals.

17. The method of claim 11, wherein the metadata and the null packet of each frame are contained in different channel signals among the plurality of channel signals.

18. The method of claim 11, wherein the low resolution content segment and the null packet of each frame are contained in different channel signals among the plurality of channel signals.

* * * * *